Sept. 9, 1924. Re. 15,913
R. W. JOHNSON
PICKING SCREEN
Original Filed March 13, 1922 3 Sheets-Sheet 1
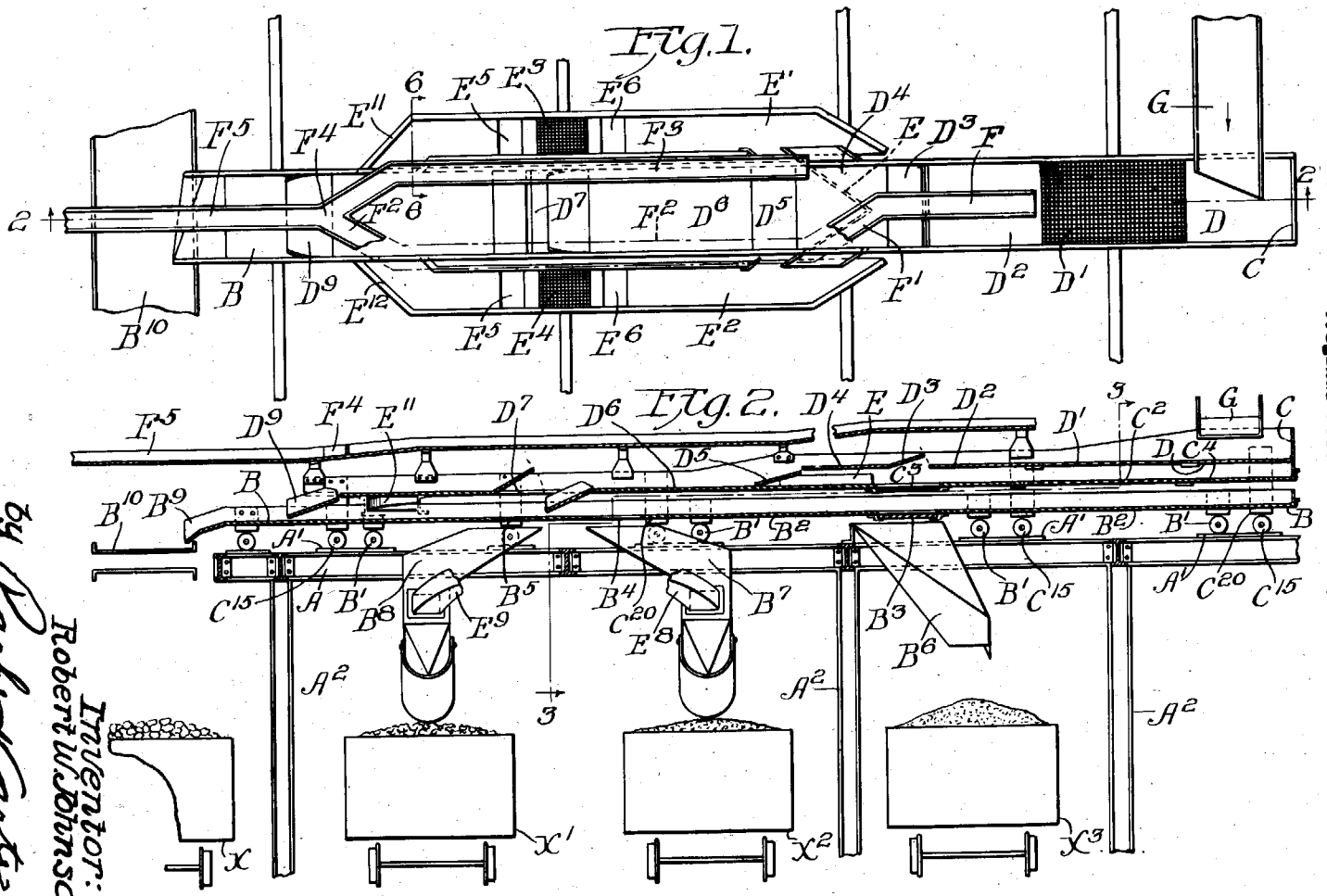
Inventor:
Robert W. Johnson
by Parker & Carter
Attys.

Sept. 9, 1924. Re. 15,913
R. W. JOHNSON
PICKING SCREEN
Original Filed March 13, 1922 3 Sheets-Sheet 2
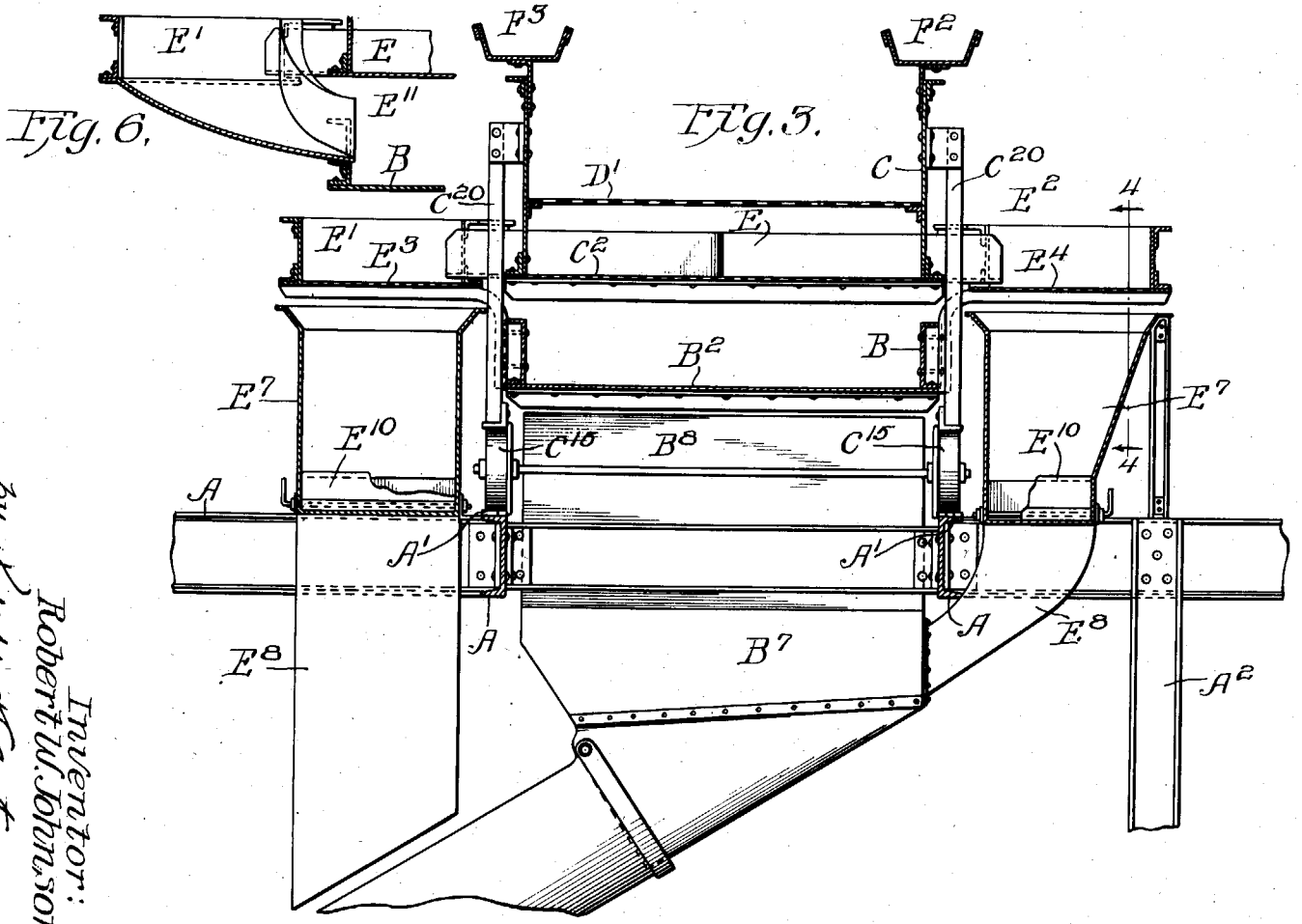
Inventor:
Robert W. Johnson
by Parts & Carter
Attys.

Sept. 9, 1924. Re. 15,913
R. W. JOHNSON
PICKING SCREEN
Original Filed March 13, 1922 3 Sheets-Sheet 3
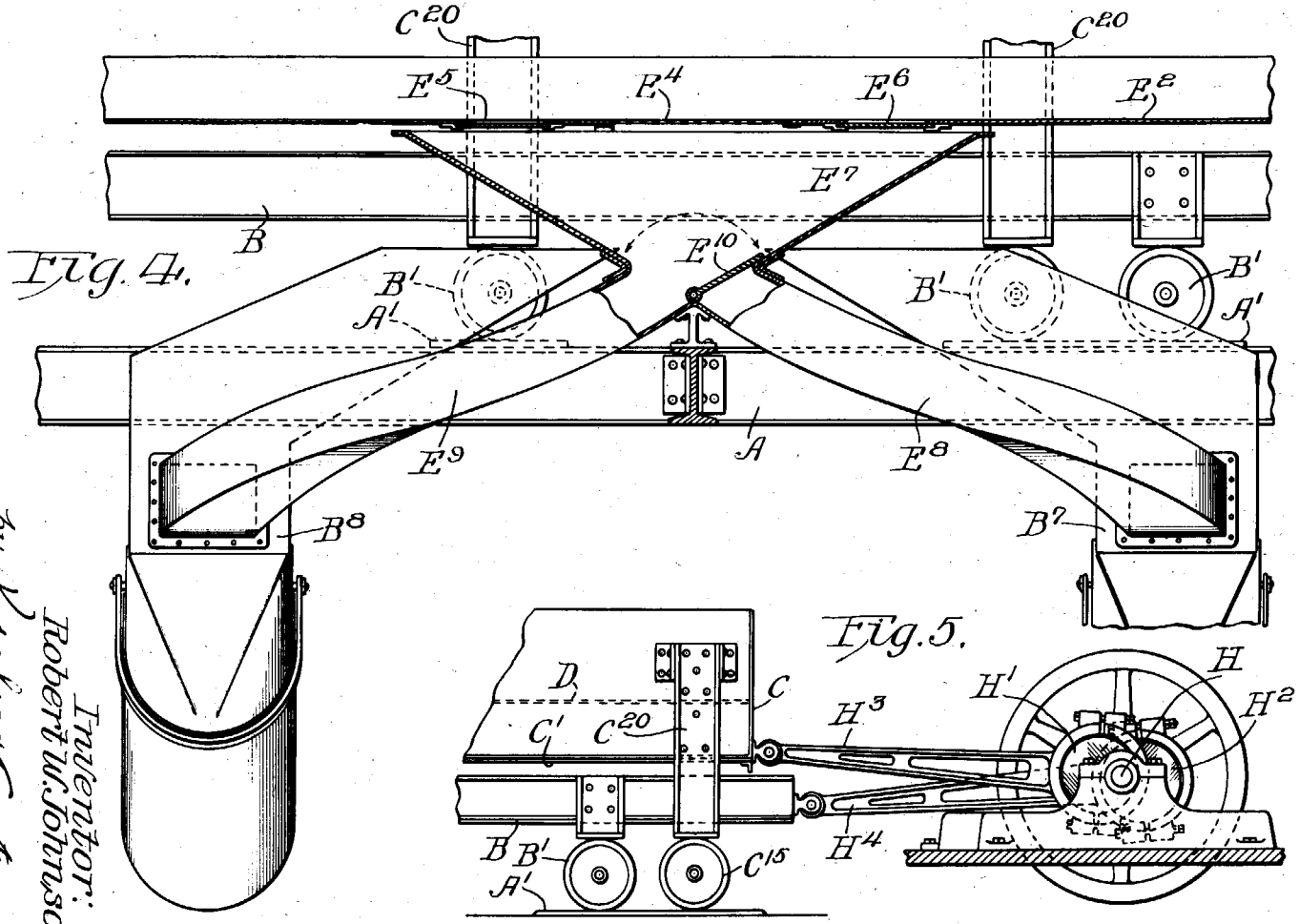
Inventor:
Robert W. Johnson
by Parker & Carter
Attys.

Reissued Sept. 9, 1924.

Re. 15,913

UNITED STATES PATENT OFFICE.

ROBERT WILLIAM JOHNSON, DECEASED, LATE OF PITTSBURGH, PENNSYLVANIA; BY ROBERTS AND SCHAEFER COMPANY, OF CHICAGO, ILLINOIS, ASSIGNEE.

PICKING SCREEN.

Original No. 1,431,667, dated October 10, 1922, Serial No. 543,143, filed March 13, 1922. Application for reissue filed February 13, 1924. Serial No. 692,596.

*To all whom it may concern:*

Be it known that ROBERT WILLIAM JOHNSON, deceased, late of the city of Pittsburgh, county of Allegheny, State of Pennsylvania, did invent certain new and useful Improvements in Picking Screens, of which the following is a full, clear, and exact description.

My invention relates to a screening and picking device, and particularly to a coal-handling device which is adapted to screen and grade coal and to permit various grades or sizes of coal or other granular material to be separately picked during the grading and the conveying consequent thereto. Other objects of my invention will appear from time to time in the course of the specification.

I illustrate my invention more or less diagrammatically in the accompanying drawings, wherein—

Fig. 1 is a plan view of the screen and picking table.

Fig. 2 is a section on the line 2—2 of Fig. 1;

Fig. 3 is a section on the line 3—3 of Fig. 2;

Fig. 4 is an enlarged side view in part along the line 4—4 of Fig. 3;

Fig. 5 is a view of the actuating means, and

Fig. 6 is a section on the line 6—6 of Fig. 1.

Like parts are illustrated by like symbols throughout the drawings and specifications.

A is any suitable supporting structure having thereon the track or tracks $A^1$, and being supported, for example, by the uprights $A^2$ over a plurality of railroad tracks, which lie preferably at right angles to the working axis of the screen.

B is the lower deck of a balanced reciprocating screen which is supported on the tracks $A^1$, as by the rollers $B^1$. It has a closed bottom, $B^2$, which is broken at various points by any suitable removable gates $B^3$, $B^4$ and $B^5$, which overlie, respectively, the delivery chutes $B^6$, $B^7$ and $B^8$. The deck B terminates in an inclined chute $B^9$ adapted to deliver, for example, to any suitable conveying means $B^{10}$, or directly to the railroad car X.

Overlying the slack deck B, and adapted to be reciprocated in opposition thereto, or in alternation therewith, is the upper deck C, mounted, for example, on the roller $C^{15}$ on the brackets $C^{20}$. The deck C has a nut and egg level $C^1$ broken by the slack screen section $C^2$. Beyond this section is a gate $C^3$ overlying the gate $B^3$ in the lower deck. Above the level $C^1$ is the upper or lump level D, which is broken by a nut and egg screen section $D^1$, beyond which is a second closed section $D^2$ which terminates in a gate $D^3$ overlying the gates $C^3$ and $B^3$. Beyond such gate is the closed section $D^4$ which terminates in an inclined section or go-down plate $D^5$, down which material may pass to the section $D^6$, which is a continuation of or at the same level as the sections $C^1$ and $C^2$ and thereafter serves as a lump conveyor. This section is, in turn, broken by a gate $D^7$ overlying the gate $B^5$ in the lower deck, and terminates in a go-down plate or chute $D^9$ which leads down to the end of the lower deck $B^2$.

On the deck $C^1$, beyond the gate $C^3$ is a V-shaped baffle E, the point of the V facing toward the stream of material as it passes from right to left, as shown in Figs. 1 and 2. This baffle deflects the material, in this case lump and egg, passing along $C^1$ to a pair of lateral conveyors or wings $E^1$ and $E^2$, which lie on either side of the upper deck C, serve as picking troughs, and are supported upon the lower deck or by any suitable frame connection. $E^1$ and $E^2$ are each broken midway of their course by screen sections $E^3$, $E^4$, shown in detail in Figure 4, and by the gates $E^5$ $E^6$, all three of which overlie a hopper $E^7$, from the bottom of which are chutes $E^8$ $E^9$ leading to the discharge chutes $B^7$ $B^8$, respectively. The material may be passed down one or the other, under control of the swinging gate $E^{10}$ or any other suitable means. At their lower ends $E^1$ and $E^2$ incline toward the central deck, and their inturned ends $E^{11}$ $E^{12}$ feed material to the lower slack deck B adjacent its end, or to C.

Secured to and above the upper deck C in any suitable manner is a refuse trough, comprising an initial single section F which inclines to the right or left as at $F^1$ adjacent the baffle E and the upper ends of the troughs $E^1$ $E^2$. The section $F^2$ continues along one of such troughs, while the second section, $F^3$, parallels the other trough $E^1$, these two sections converging as at $F^4$ to join the single disposal section $F^5$.

Material is fed into the whole device in any suitable manner, as for example through the chute G. The two decks are reciprocated on the horizontal plane in opposition to each other, as for example through the rotating shaft H, the eccentrics $H^1$ $H^2$ thereupon, and the pitman $H^3$ $H^4$ secured to the upper and lower decks, respectively.

It will be realized that while I have illustrated a working device, the details thereof must be taken largely diagrammatically, and many changes might be made in the number, shape, design, size and disposition of parts without departing from the spirit of my invention.

The use and operation of my invention are as follows:

Any mixed material, and preferably run-of-mine coal, is fed upon the top deck or level, as shown in Fig. 1. The rotation of the driving shaft and the eccentrics thereupon gives an irregular conveying motion, which need not here be described, the result being that the material on the screen assembly passes from right to left, as shown in Figs. 1 and 2. If, for example, run-of-mine coal, of various and irregular sizes, is fed to the screen, it passes first over the screen $D^1$ in the upper level D. This is preferably a large mesh screen, for example of 3 inch mesh. All lump sizes of 3 inch or over pass thereover, while anything less than 3 inches drops through upon the screen $C^2$. This screen is a finer screen and through it pass the fines or slack to the bottom level $B^2$. The intermediate sizes, that is egg and nut, pass along the second deck and through or over the screen $C^2$. If the gate $C^3$ is closed, the intermediate grade is deflected by the baffle E to the side or picking screens $E^1$ $E^2$. The fines again pass through the screens $E^3$ $E^4$ and the picked coal passes through or over the gates $E^5$ $E^5$ and is deflected back to the lower level $B^2$, as by the inwardly inclined portions $E^{11}$ $E^{12}$, or with slight modification, to the upper level. It then passes out over the final chute $B^9$, either to the conveyor $B^{10}$ or to the car X, to which it may be loaded by any suitable means. While this picked, graded coal may be passed through the entire screen system and to the end track or conveyor, it may also be dropped to cars at intermediate points. If the gates $C^3$ and $B^3$ are both left open, the graded coal passes, before picking, through the chute $B^6$ to the car $X^3$, together with the slack. Through the gates $E^5$ and $E^6$ it may be passed down the chutes $A^8$ and $A^9$ to the car $X^1$ or $X^2$. The slack may similarly be discharged either at the end track or conveyor or to the intermediate tracks, through opening or closing of the gates $B^3$, $B^4$ and $B^5$. The lump coal bigger than 3 inch, or the size of the upper screen $D^1$, may be dropped through the gates $D^3$, $C^3$ and $B^3$ directly to the chute $B^6$ and the car $X^3$, or it may pass over the gate $D^3$ when closed, and down the incline $D^5$, to the second level $D^6$. The gate $D^7$ furnishes means for dropping it through to the car $X^1$, and if that gate is closed it runs over the incline $D^9$ and thus to the conveyor $B^{10}$ and the car X.

It will thus be clear that to the first track car $X^3$ either slack alone may be passed, or egg and slack, or run-of-mine, viz: all three grades. To the second car $X^2$ slack alone may be passed, or picked egg alone, or picked egg and slack, or picked run-of-mine. To the car $X^1$ may be fed picked egg, picked $1\frac{1}{4}$ inch lump, picked 3 inch lump, picked run-of-mine, or slack. And a similar choice is open for feed to the last car X.

Any suitable means, not herein shown, may be provided to support the pickers which pick the coal as it passes along the various screens. The large or 3 inch lump may be picked directly into the section $F^1$ of the refuse trough. The branches $F^2$ and $F^3$ take care of the picking troughs $E^1$ and $E^2$ over which passes the coal intermediate the 3 inch lump and the slack, and the section 5 conveys away the refuse picked from the various screens.

I claim:

1. A reciprocating screen comprising a central section extending substantially from end to end of the screen and a plurality of side sections adapted to be supplied with material therefrom.

2. A plural level reciprocating screen comprising a central section and a plurality of side sections adapted to receive material from an upper level of the screen and to return it to a lower level of said screen.

3. A plural level reciprocating screen comprising a central section and a plurality of side sections adapted to receive material from one level of the screen and to return it to another level of said screen.

4. A reciprocating screen comprising a central section and a plurality of side sections adapted to receive material therefrom, and a refuse trough adjacent and substantially parallel with each of said side sections.

5. A reciprocating screen comprising a central section and a plurality of side sections separate therefrom and adapted to be supplied with material therefrom, and a branched refuse trough one branch of which is adjacent and substantially parallel with each of said side sections.

6. A reciprocating screen having a plurality of levels, a picking trough adjacent thereto and adapted to receive material from one level of the screen and deliver it to another level thereof.

7. A reciprocating screen having a plurality of levels, a picking trough adjacent thereto and adapted to receive material from one level of the screen and deliver it to another level thereof, and a screen surface intermediate the ends of said picking trough.

8. A reciprocating screen having a plurality of levels, a picking trough adjacent thereto and adapted to receive material from one level of the screen and deliver it to another level thereof, and a delivery chute and gate therefor intermediate the ends of the picking trough.

9. A reciprocating screen having a plurality of levels, a picking trough adjacent thereto and adapted to receive material from one level of the screen and deliver it to another level thereof, a screen surface intermediate the ends of said picking trough, and a delivery chute and gate therefor intermediate the ends of the picking trough.

10. A reciprocating screen assembly comprising upper and lower elements reciprocating in opposition to each other, adjacent picking troughs adapted to receive material from the upper element and deliver it to the lower element.

11. A reciprocating screen assembly comprising upper and lower elements reciprocating in opposition to each other, and adjacent picking troughs adapted to receive material from the upper element and deliver it to the lower element, said troughs being mounted upon and reciprocating with said lower element.

12. In a reciprocating screen, an upper level and a lower level and adjacent picking troughs, and means for diverting material conveyed along the lower level to said picking troughs, and adjacent means for lowering the material conveyed along the upper level to the lower level.

13. In a reciprocating screen, an upper level and a lower level and adjacent picking troughs, and means for diverting material conveyed along the lower level to said picking troughs, and adjacent means for lowering the material conveyed along the upper level to the lower level comprising a baffle across said lower level and a chute adjacent and beyond said baffle.

14. In a reciprocating screen, an upper level and a lower level and adjacent picking troughs, and means for diverting material conveyed along the lower level to said picking troughs, adjacent means for lowering the material conveyed along the upper level to the lower level, and aligned screens of varying mesh in said levels.

15. In a reciprocating screen, an upper level and a lower level and adjacent picking troughs, and means for diverting material conveyed along the lower level to said picking troughs, adjacent means for lowering the material conveyed along the upper level to the lower level, and aligned screens of varying mesh in said levels, together with aligned gates in said levels and means for opening and closing them independently.

16. A reciprocating screen assembly comprising upper and lower elements reciprocating in opposition to each other, the lower element comprising a substantially continuous conveying surface, a plurality of gates therein, and means for opening and closing them independently, the upper element comprising a plurality of screening levels and gates therein in line with the gates in the lower element.

17. A reciprocating screen assembly comprising upper and lower elements reciprocating in opposition to each other, the lower element comprising a substantially continuous conveying surface, a plurality of gates therein and means for opening and closing them independently, said upper element comprising a lower level and a screen at one end thereof and gates in line with the gates of the lower level, a baffle, and conveying means adapted to receive the material deflected by said baffle, an upper level overlying said lower level and adapted to deliver said material to said lower level beyond said baffle.

18. A reciprocating screen assembly comprising upper and lower elements reciprocating in opposition to each other, the lower element comprising a substantially continuous conveying surface, a plurality of gates therein and means for opening and closing them independently, said upper element comprising a lower level, a baffle, conveying means adapted to receive the material deflected by said baffle, an upper level overlying said lower level and adapted to deliver said material to said lower level beyond said baffle, a screen in the upper level overlying the screen in the lower, and gates in the upper level overlying the gates in the lower.

19. A reciprocating screen assembly comprising upper and lower elements reciprocating in opposition to each other, the lower element comprising a substantially continuous conveying surface, a plurality of gates therein and means for opening and closing them independently, said upper element comprising a lower level and a screen at one end thereof and gates in line with the gates of the lower level, a baffle, and conveying means adapted to receive the material deflected by said baffle, comprising a picking trough substantially parallel with said lower element and reciprocating therewith.

20. A reciprocating screen assembly comprising upper and lower elements reciprocating in opposition to each other, the lower element comprising a substantially continuous conveying surface, a plurality of gates therein and means for opening and closing them independently, said upper element comprising a lower level and a screen at one end thereof and gates in line with the gates of the lower level, a baffle, conveying means adapted to receive the material deflected by said baffle, comprising a picking trough substantially parallel with said lower element and reciprocating therewith, and a screen surface intermediate the ends of such trough.

21. A reciprocating screen comprising a central section and a plurality of side sections extending substantially from end to end of the screen adapted to receive material therefrom and to return it to the central section.

22. A reciprocating screen comprising a central section and side sections extending substantially from end to end of the screen adapted to receive material deflected from the central section and adapted to deliver the material back to the central section.

23. A reciprocating screen comprising an upper and lower conveying level, screening means in the upper level, a picking trough laterally out of line with said screen, and a baffle on the lower level of the screen adapted to guide material therefrom laterally toward the picking trough.

24. A reciprocating screen comprising lump, egg and slack decks arranged one above the other, screens in the two upper decks, a picking trough arranged at one side of the center line of the screen, a baffle on the egg deck adapted to deflect material to the picking trough, a go-down plate in continuation of the lump deck beyond the baffle adapted to convey material from the lump deck down to substantially the same level as the picking trough, the picking trough being at one side of the lump carrying surface beyond the go-down plate.

25. A screen comprising lump and egg decks arranged one above the other, a screen in the upper deck, a picking trough arranged at one side of the center line of the screen, a baffle on the egg deck adapted to deflect material to the picking trough, a go-down plate in continuation of the lump deck beyond the baffle adapted to convey material from the lump deck down to substantially the same level as the picking trough, the picking trough being at one side of the lump carrying surface beyond the go-down plate.

26. A reciprocating screen comprising lump, egg and slack decks arranged one above the other, screens in the two upper decks, a picking trough arranged at one side of the center line of the screen, a baffle on the egg deck adapted to deflect material to the picking trough, a go-down plate in continuation of the lump deck beyond the baffle adapted to convey material from the lump deck down to substantially the same level as the picking trough.

27. A screen comprising lump and egg decks arranged one above the other, a screen in the upper deck, a picking trough arranged at one side of the center line of the screen, a baffle on the egg deck adapted to deflect material to the picking trough, a go-down plate in continuation of the lump deck beyond the baffle adapted to convey material from the lump deck down to substantially the same level as the picking trough.

28. A reciprocating screen comprising lump and egg decks arranged one above the other, a screen in the lump deck, picking troughs arranged at either side of the center line of the screen, a baffle on the egg deck adapted to deflect material to said troughs, a go-down plate in continuation of the lump deck between the picking troughs adapted to convey material from the lump deck down to substantially the same level as the picking troughs, the picking troughs being located at either side of the lump carrying trough beyond the go-down plate.

29. A reciprocating screen comprising upper and lower conveying levels, a screen in the upper lever, a picking trough located at one side of the center line of the screen, a baffle on the lower level adapted to guide material therefrom to the trough, a gate in the picking trough.

30. A reciprocating screen comprising lump, egg and slack decks arranged one above the other, screens in the two upper decks, a picking trough arranged at one side of the center line of the screen, a baffle on the egg deck adapted to deflect material to the picking trough, a go-down plate in continuation of the lump deck beyond the baffle adapted to convey material from the lump deck down to substantially the same level as the picking trough, the picking trough being at one side of the lump carrying surface beyond the go-down plate, the slack deck toward the discharge end of the screen being of substantially the same width as the lump carrying deck, and located below the lump and egg carrying trough.

31. A reciprocating screen comprising lump, egg and slack decks arranged one above the other, screens in the lump and egg decks, picking troughs arranged at either side of the center line of the screen, a baffle on the egg deck beyond the screen adapted to deflect material to the picking troughs, a go-down plate in continuation of the lump deck beyond the baffle and between the picking troughs adapted to convey material from the lump deck down to substantially the same level as the picking trough.

32. A reciprocating screen comprising lump, egg and slack decks arranged one above the other, screens in the lump and egg decks, picking troughs arranged at either side of the center line of the screen, a baffle on the egg deck beyond the screen adapted to deflect material to the picking troughs, a go-down plate in continuation of the lump deck beyond the baffle and between the picking troughs adapted to convey material from the lump deck down to substantially the same level as the picking trough, and a lump trough beyond the go-down plate located between and at substantially the same level as the picking troughs.

33. A reciprocating screen comprising lump, egg and slack decks arranged one above the other, screens in the lump and egg decks, picking troughs arranged at either side of the center line of the screen, a baffle on the egg deck beyond the screen adapted to deflect material to the picking troughs, a go-down plate in continuation of the lump deck beyond the baffle and between the picking troughs adapted to convey material from the lump deck down to substantially the same level as the picking trough, and a lump trough beyond the go-down plate located between and at substantially the same level as the picking troughs, and a go-down plate in continuation of such lump trough adapted to convey material therefrom down to substantially the same level as the slack deck at that point.

Signed at Chicago, in the county of Cook and State of Illinois, this 9th day of February, 1924.

ROBERTS AND SCHAEFER COMPANY,
By EDWARD E. BARRETT,
*Vice-President,*
*Assignee of Robert William Johnson, deceased.*

Witnesses:
MARION L. HOUSE,
RUTH STUART.